US 6,637,690 B2

(12) United States Patent
Matsuda

(10) Patent No.: US 6,637,690 B2
(45) Date of Patent: Oct. 28, 2003

(54) SPINNING REEL FOR FISHING

(75) Inventor: Kazuyuki Matsuda, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 10/025,700

(22) Filed: Dec. 26, 2001

(65) Prior Publication Data

US 2002/0079395 A1 Jun. 27, 2002

(30) Foreign Application Priority Data

Dec. 26, 2000 (JP) ........................................ 2000-395205

(51) Int. Cl.[7] .............................................. A01K 89/01
(52) U.S. Cl. ...................... 242/231; 242/319; 242/321
(58) Field of Search ................................. 242/231, 319, 242/321, 232, 157 R

(56) References Cited

U.S. PATENT DOCUMENTS

| 4,969,613 | A | * | 11/1990 | Kaneko | 242/231 |
| 5,954,284 | A | * | 9/1999 | Tsukihiji et al. | 242/231 |
| 6,102,317 | A | * | 8/2000 | Bernard et al. | 242/319 |
| 6,227,474 | B1 | * | 5/2001 | Okada | 242/231 |
| 6,286,772 | B1 | * | 9/2001 | Koelewyn | 242/246 |
| 6,336,604 | B1 | * | 1/2002 | Aratake et al. | 242/231 |

FOREIGN PATENT DOCUMENTS

| JP | 6-15469 | 3/1994 |
| JP | 8-308444 | 11/1996 |

* cited by examiner

Primary Examiner—Emmanuel Marcelo
(74) Attorney, Agent, or Firm—Sughrue Mion, PLLC

(57) ABSTRACT

The line roller 23 is rotatably supported on the supporting portion 17 of a supporting member 11 through bearings 25, 27. The bearings are interposed between an inner periphery of the line roller and the supporting portion of a supporting member, arranged in parallel in the axial direction, and are separately disposed each other. The opposite ends of the bearings are in contact with stopping portions in the inner periphery of the line roller. The bearing 25 has an outer end being in contact with a stopper 33 of the support member through a first seal member 31, while the bearing 27 has an outer end being in contact with a stopper 37 of the support member through a second seal member 35. The first and second sealing members are supported as being held between the bearings and the stoppers respectively.

8 Claims, 4 Drawing Sheets

SPINNING REEL FOR FISHING

BACKGROUND OF THE INVENTION

The present invention relates to a spinning reel for fishing, and more particularly relates to a spinning reel for fishing having characteristics in a fishing line guide device, for guiding a fishing line to a spool, which is rotated together with a rotor rotating in accordance with operation of a handle.

Generally, the fishing line guide device of the spinning reel for fishing is provided with a line roller for guiding the fishing line to wind the line around the spool. The line roller is generally rotatably supported through the bearings so as to improve guiding property of the fishing line, but since the line roller is a portion directly contacting with the fishing line to which much water and dusts are attached, the water and dust come into an outer periphery and an inner part of the support member supporting the line roller. In case that the water and dusts invade, rotation performance of the roller is lowered and the line winding efficiency becomes poor accordingly, and further, rusts are produced to bring about inconvenience to the line guiding function.

Therefore, for example, as disclosed in JP-A-6-15469U or JP-A-8-308444, a fishing line guide device is proposed which is treated with a waterproof for improving a smooth rotation of the line roller and preventing generation of rust.

However, the fishing line guide device mentioned above has problems as follows.

JP-A-6-15469U discloses a fishing line guide device having a sticky sealing material filled in a gap between a line roller side and a support member. However, the sticky sealing material may be mixed with water and, for example, denatured owing to use for a long period to be easily deteriorated and hardened, so that the rotating performance of the roller is lowered and becomes unstable. The sticky sealing material is removed when washing for maintenance after use, and is required to re-fill, deteriorating the maintenance, thereby being uneconomical.

JP-A-8-308444 discloses a fishing line guide device in which a bush is interposed between the outer ring of a bearing and the inside of the line roller, and an inner projection formed on the bush at one end thereof is contacted (called as "contact portion" hereafter) to a supporting member, and a seal member is provided between the inside of the opposite end of the bush and a shaft, thereby waterproofing the bearing of the line roller. In such a structure, if the bush of a hard material is used to maintain supporting precision of the line roller, it becomes difficult to secure a sufficient waterproof effect to the contacting portion, and the rotating efficiency of the line roller goes down due to force of the contacting portion. In case a bush of an elastic material is used, taking the waterproofing effect into consideration, it becomes difficult to stably support the line roller, and as a result, a bad rotation might result due to rattling play or eccentricity.

SUMMARY OF THE INVENTION

The invention has been accomplished to solve the problems as described. It is, therefore, an object of the invention to provide a spinning reel for fishing having a fishing line guide wherein the rotation of the line roller is stabilized while bearing function and the waterproof function of the line roller are heightened.

In order to solve the aforesaid object, the invention is characterized by having the following arrangement.

(1) A spinning reel for fishing comprising:
 a body;
 a rotor which is rotatably attached to the body and is rotated in accordance with rotation of a handle;
 a supporting arm mounted on the rotor;
 a supporting member attached to the supporting arm;
 a supporting portion defined between the supporting arm and the supporting member;
 a bearing member supported by the supporting portion;
 a line roller, for guiding a fishline, rotatably supported by the bearing member; and
 a pair of seal members for sealing a part between the line roller and the supporting portion, which are disposed on opposite sides of the bearing member, and separated from the bearing member in a direction of an rotation axis of the line roller.

(2) The spinning reel according to (1), wherein the line roller is supported by the bearing member so that movement in axial direction of the line roller with respect to the supporting part is prevented.

(3) The spinning reel according to (2), wherein
 the bearing member includes a first bearing and a second bearing, and
 the line roller is provided with a stopper portion which is interposed between the first bearing and the second bearing.

(4) The spinning reel according to (3), wherein
 the supporting arm is provided with a first stopper and the supporting member is provided with a second stopper, and
 the first bearing is held between the stopper portion and the first stopper, and the second bearing is held between the stopper portion and the second stopper.

(5) The spinning reel according to (4), wherein
 one of the pair of seal members is interposed between the first bearing and the first stopper, and the other seal member is interposed between the second bearing and the second stopper.

(6) The spinning reel according to (3) further comprising a stopper abutted against the supporting member,
 wherein the supporting portion is provided with a peripheral groove into which one of the pair of the seal members is inserted, and
 wherein the first bearing is held between the stopper portion and the one of the pair of the seal members, and the second bearing is held between the stopper portion and the stopper.

(7) The spinning reel according to (6), wherein
 the other seal member is interposed between the second bearing and the stopper.

(8) The spinning reel according to (1), wherein the pair of seal members are provided with taper portions, respectively.

According to the structure above described, the respective couples of the bearings rotatably supporting the line roller and the sealing members are arranged as spaced from each other in the axial direction, so that the bearing function and the waterproofing function are independently served and maintained stable without probability of decline.

DETAILED DESCRIPTION OF PREFERRED EMBODIMENTS

First Embodiment

A spinning reel for fishing according to a first embodiment of the invention will be explained with reference to the attached drawings.

Figure 1:
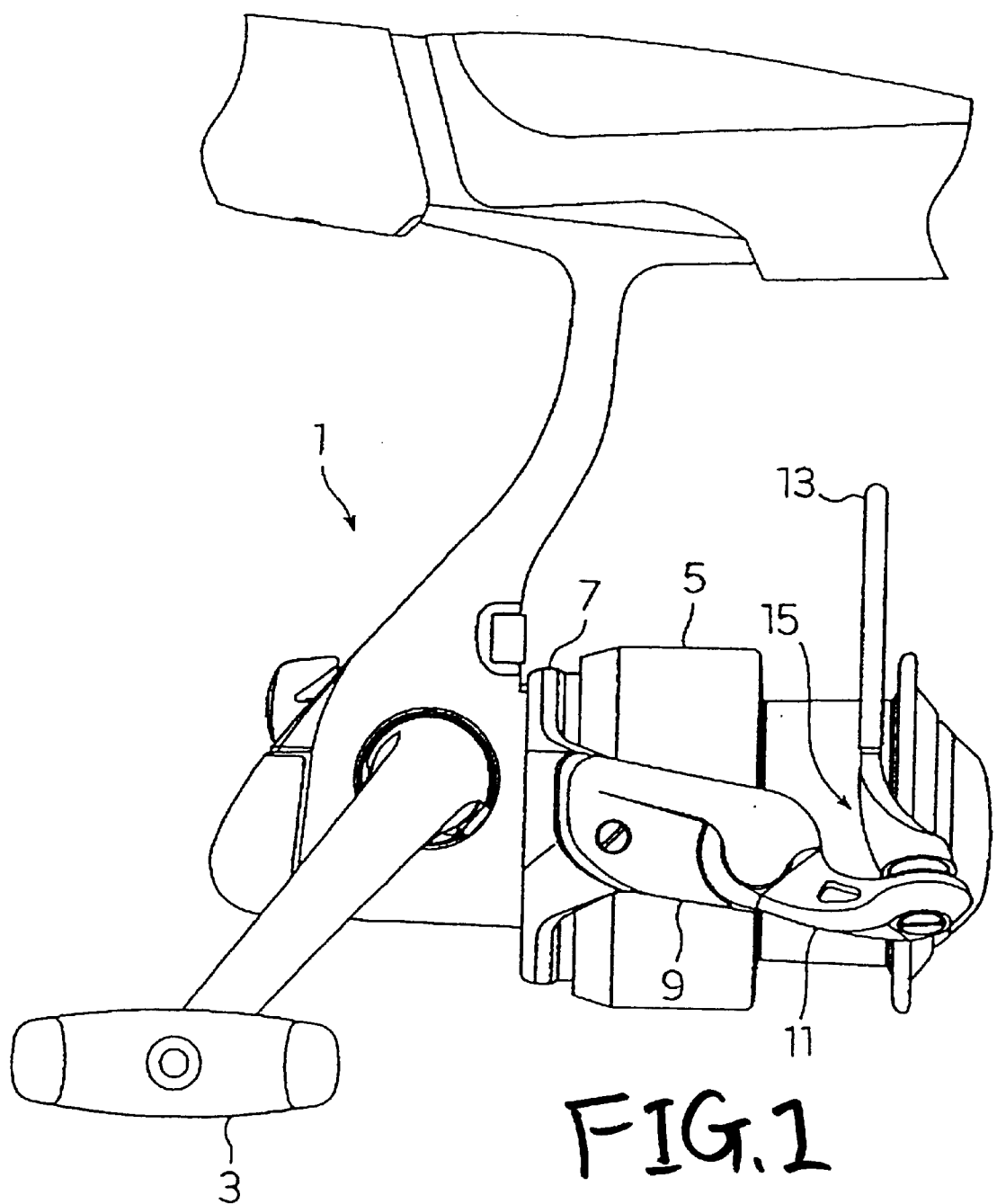
FIG. 1 is a view showing the exterior structure of the spinning reel for fishing.

As shown in FIG. 1, the spinning reel for fishing includes a drive gear (not shown) provided in a reel main body 1 to be driven by rotation of a handle 3. The drive gear meshes with a pinion (not shown). A spool shaft (not shown) is axially inserted through the pinion. The spool shaft includes a distal end rotatably attached to a spool 5 for winding the fishing line therearound. In this case, the spool shaft (spool) is so constituted as to be moved back and forth through an oscillating mechanism (not shown) in association with rotation of the drive gear.

The pinion has a distal end attached to a rotor 7 to be rotated together with the pinion, and the rotor 7 has a pair of support arms 9. A bail 13 respectively is mounted on the support arms 9 through supporting members 11. The bail 13 can be rotated between a state of leasing the fishing line and a state of winding up the fishing line and can be held in the states. A fishing line guide device 15 is supported between one of the support members 11 and the bail 13 as will be later described.

With such a the structure, when the handle 3 is rotated, the rotational movement is transmitted to the pinion through the drive gear, and the rotor 7 is rotated through the pinion while the rotational movement is transmitted to the spool through the oscillating mechanism to move the spool 5 back and forth. Thereby, the fishing line is evenly wound around the spool 5 through the fishing line guide device 15 without being partially biased.

Figure 2:
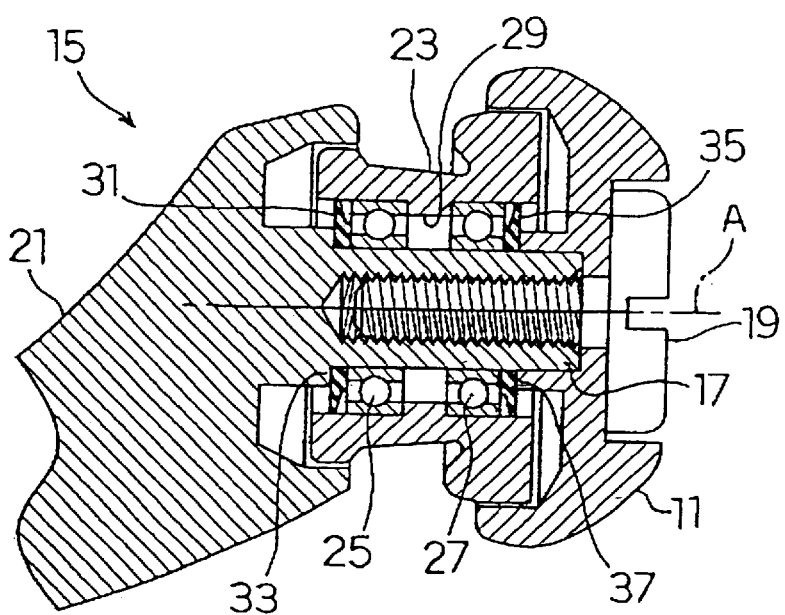
FIG. 2 is a cross sectional view showing the structure of the fishing line guide device adapted to the first embodiment of the invention.

As shown in FIG. 2, the fishing line guide device 15 according to the embodiment is fixedly connected to one of the support members 11 by a screw 19, and includes a line slider 21 formed with a supporting portion 17 for the screw axially extending. The supporting portion 17 may be, as shown, formed in one body with the line slider 21, or may be formed in one body with the supporting member 11.

One end of the bails 13 is a base portion connected to the line slider 21. When the bail 13 is rotated to the state of winding the fishing line to start to wind up the line on the spool, the fishing line is guided and slid from the bail 13 through the line slider 21 to the line roller 23 as a part of the composing members of the fishing line guide device 15.

The line roller 23 is rotatably supported by the support portion 17 through one or a plurality of bearings (in the embodiment, two bearings 25, 27 by way of one example). In this case, the line roller 23 is hollow and substantially cylindrical, having an outer periphery of smooth surface. The fishing A line guided from the bail 13 through the line slider 21 when winding, may smoothly slide on the outer peripheral surface of the line roller 23 and is wound around the spool 5. The shape of outer periphery of the line roller 23 is not specifically limited.

The two bearings 25, 27 are provided between the inner peripheral surface of the line roller 23 and the support portion 17, and are arranged in parallel in the axial direction (the direction along a rotational axis A of the line roller 23), and separately disposed each other.

The opposite ends of the two bearings 25, 27 are contacted to a stopper portion 29 protruded from the inner periphery of the line roller 23. The bearing 25 has an outer side end which is abutted against a stopper portion 33 formed at the support portion 17 through a first seal member 31. On the other hand, the bearing 27 has an outer side end which is abutted against a stopper portion 37 through a second seal member 35, the stopper portion 37 being formed at the support member 11 and covering the end portion of the support portion 17.

In this case, the two bearings 25, 27 are prevented from moving axially by the stoppers 29, 33, 37. The first and second seal members 31, 35 seal the part between the outer periphery of the support portion 17 and the inner periphery of the line roller 23, and are held between the two bearings 25, 27 and the stoppers 33, 37. Accordingly, the line roller 23 supported by the two bearings 25, 27 is rotatably supported through the two bearings 25, 27 under the condition of regulating the axial movement with respect to the support portion 17 of the support member 11, and the respective bearings 25, 27 are sealed through the seal members 31, 35.

The first and second seal members 31, 35 may be made of materials such as nitrile rubber, urethane rubber, fluoro rubber, silicone rubber, or ethylene-propylene rubber. The shape of the seal members 31, 37 may be assumed ring-like or circular, but in so far as the seal members have a waterproof function in the line roller 23, the shape is not be specifically limited, but may be optional.

According to the first embodiment, the first and second seal members 31 and 35 as well as the two bearings 25 are 27 are separately arranged in the axial direction, so that it is possible to realize the fishing line guide device 15 which improves the bearing function and the waterproofing function of the line roller 23. Therefore, the line roller 23 may maintain a smooth rotation for a long time.

Further, in addition to the above mentioned structure, the stoppers 29, 33, 37 are provided to engage the bearings 25, 27 to regulate the line roller 23 in the axial movement. It is possible to prevent the first and second seal members 31, 35 from deformation and damage, thereby to maintain the good waterproofing function for a long period of time.

Second Embodiment

Subsequently, a spinning reel for fishing according to a second embodiment of the invention will be explained with reference to FIG. 3.

According to the embodiment as will be described below, a fishing line guide device 15 is different from that of the first embodiment and other structures are the same. Therefore, the following description will be limited to the different parts of the fishing line guide device 15, and the same parts are indicated with the same reference numerals to omit explanation therefor.

Figure 3:
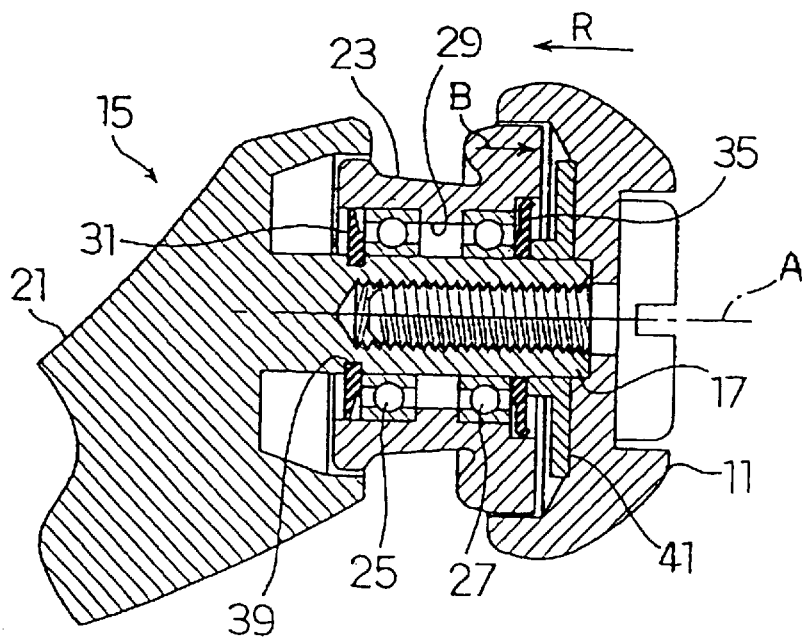
FIG. 3 is a cross sectional view showing the structure of the fishing line guide device adapted to the second embodiment of the invention.

As shown in FIG. 3, in the fishing line guide device 15 according to the embodiment, the first seal member 31 has a portion fitted in a peripheral groove 39 formed in the outer peripheral surface of the support portion 17, and the second seal member 35 is in contact with a stopper 41. In this case, the stopper 41 is formed with a member different from the support member 11 and the line slider 21, and the stopper 41 is disposed between the line roller 23 and the support member 11 when setting up the device.

The bearing 25 is pressed toward the stopper 29 by elastic force of the first seal member 31 fitted in the peripheral groove 39, and the pressing force is transmitted to the second seal member 35 through the bearing 27 and is held by the stopper 41. Therefore, preferably the stopper 41 is made of a material of comparatively high rigidity such as, for example, metal, POM (Polyacetal, Polyoxymethylene) or ABS (acrylonitrile-butadiene-styrene resin).

With the structure as described above, when the fishing line guide device 15 is rotated in a direction of an arrow R when winding up the fishing line, the force is given by the fishing line through the line roller 23 in the direction of an arrow B, and this force B is held by the stopper 41. On the other hand, in case the force is given in the opposite direction, the force is held by the first seal member 31 at a level without producing practical problem. Namely the two bearings 25, 27 are maintained under the condition of regulating the movement in the axial direction by the first seal member 31 and the stopper 41, while the line roller 23 supported by the two bearings 25, 27 is held as regulated in the movement in the axial direction with respect to the support portion 17 via the bearings 25, 27.

Other operational effects are the same as in the first embodiment and no description is made.

Third Embodiment

Next, a spinning reel for fishing of a third embodiment of the invention will be explained with reference to FIG. 4.

Figure 4:
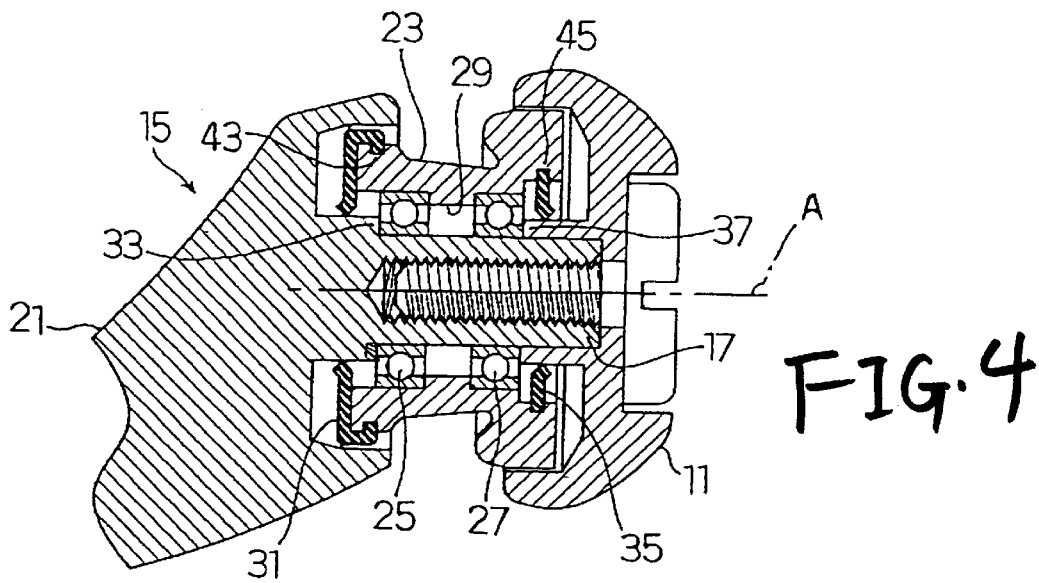
FIG. 4 is a cross sectional view showing the structure of the fishing line guide device adapted to the third embodiment of the invention.

As shown in FIG. 4, in the fishing line guide device 15 according to the third embodiment, the first seal member 31 includes a portion fitted in a peripheral groove 43 formed in the outer peripheral surface of the line roller 23, while the second seal member 35 has a part fitted in a peripheral groove 45 formed in the inner peripheral surface of the line roller 23. In this case, the opposite ends of the two bearings 25, 27 are in contact with the stopper 29 formed in the inner periphery of the line roller 23. The outer end of the bearing 25 is in contact with the stopper 33 formed in the support portion 17, while the outer end of the bearing 27 is in contact with the stopper 37 formed in the support member 11 in the same manner as the first embodiment.

With such a structure, since the two bearings 25, 27 are prevented from the axial movement by the stoppers 29, 33, 37, the line roller 23 supported by the two bearings 25, 27 is prevented from the axial movement with respect to the support portion 17 by the bearings 25, 27.

Since the bearings are waterproofed by the first seal member 31 and the second seal member 35 respectively, the line roller 23 may maintain the smooth rotation for a long period of time.

Other operational effects are the same as in the first embodiment and no explanation will be made.

Fourth Embodiment

A spinning reel for fishing of a fourth embodiment of the invention will be explained with reference to FIG. 5.

Figure 5:
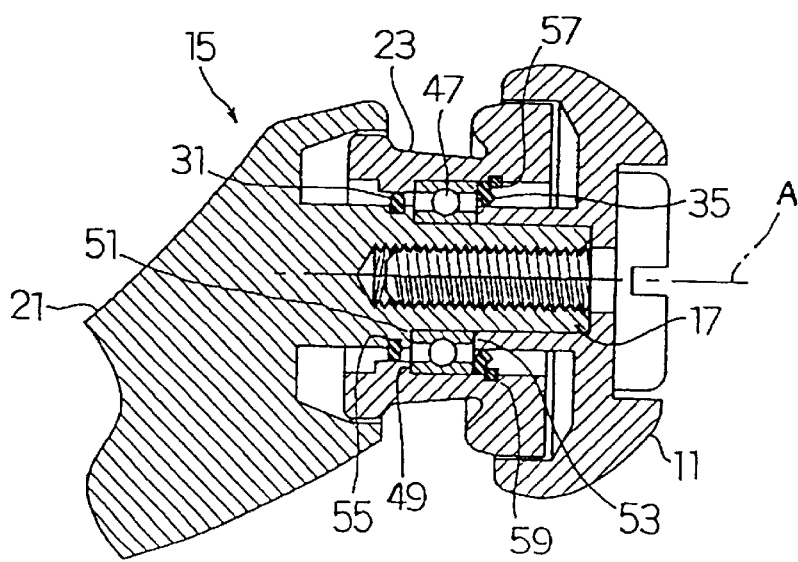
FIG. 5 is a cross sectional view showing the structure of the fishing line guide device adapted to the fourth embodiment of the invention.

As shown in FIG. 5, in the fishing line guide device 15 according to the fourth embodiment, the line roller 23 is rotatably supported on the support portion 17 through one bearing 47. The bearing 47 has one end being in contact with the end surface of a stopper 49 protruded from the inner periphery of the line roller 23 and being in contact with the end surface of a stopper 51 protruded from the outer periphery of the support portion 17, and has the other end being in contact with the end surface of a stopper 53 formed at the support member 11 and covering the support portion 17.

The first seal member 31 includes a portion fitted in a peripheral groove 55 formed at the outer periphery of the support portion 17. The second seal member 35 is in contact with a ring like member 57 (for example, C ring or O ring) which is in engagement with a peripheral groove 59 formed in the inner periphery of the line roller 23.

In this case, the bearing 47 is prevented from the axial movement by the stoppers 49, 51, 53. The second seal member 35 is held between the bearing 47 and the ring like member 57. Further, for the purpose of positioning the second seal member 35 to exhibit the waterproofing function, the ring-like member 57 may preferably made of a material, for example, such as stainless steel.

With such a structure, since a single bearing 47 can be prevented from the axial movement by the stoppers 49, 51, 53, it is possible to realize the fishing line guide device 15 enabling to exhibit a reliable bearing function with parts of the less number.

Other operational effects are the same as in the first embodiment and no explanation will be further made.

Fifth Embodiment

A spinning reel for fishing of a fifth embodiment of the invention will be explained with reference to FIG. 6.

Figure 6:
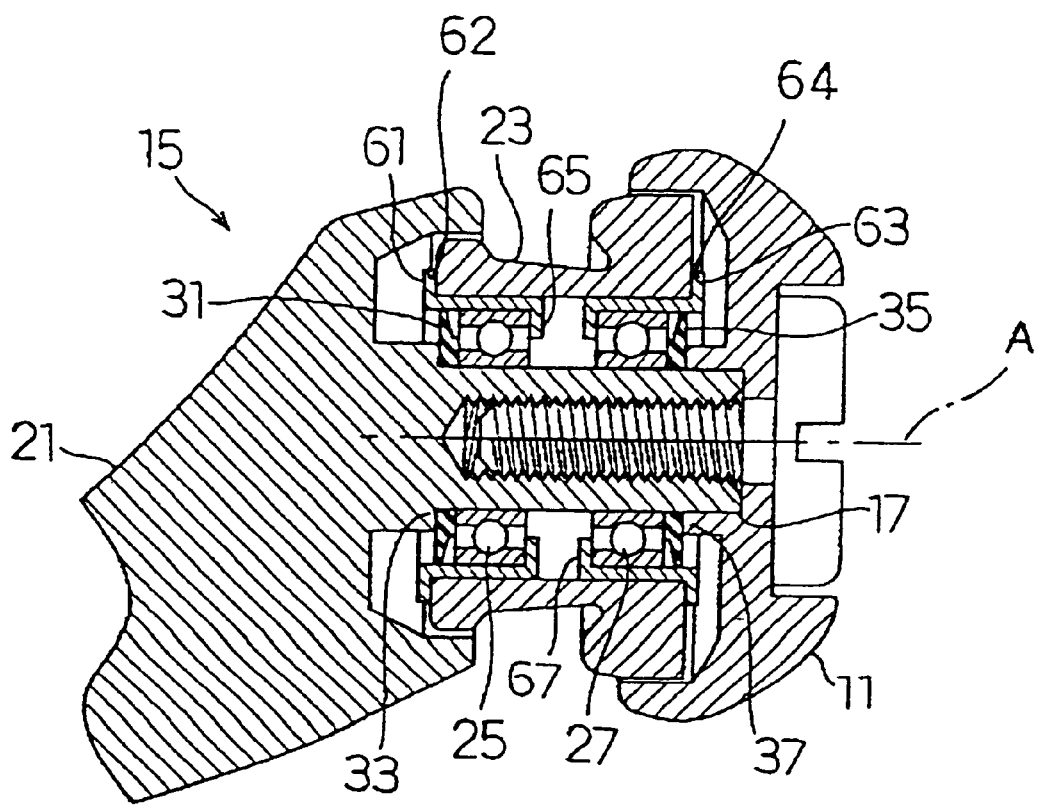
FIG. 6 is a cross sectional view showing the structure of the fishing line guide device adapted to the fifth embodiment of the invention.

As shown in FIG. 6, in the fishing line guide device 15 applied to the embodiment, the two bearings 25, 27 are in contact to the respective ends of the line roller 23 through stoppers 62, 64, interposed between first and second collars 61, 63 and the support portion 17, and arranged in parallel in the axial direction, and separately disposed each other.

The two bearings 25, 27 includes the opposite ends being in contact respectively with stopper portions 65, 67 projected from the inner ends of the first and second collars 61, 63 toward the center. Namely, the bearing 25 includes the outer end being in contact with the stopper 33 through the first seal member 31 and includes the opposite end being in contact with the stopper portion 65 of the first collar 61. The bearing 27 includes the outer end being in contact with the stopper 37 through the second seal member 35 and includes the opposite end being in contact with the stopper portion 67 of the second collar 63.

In this case, the two bearings 25, 27 are prevented from the axial movement by the stoppers 33, 65, 37, 67. The first and second seal members 31, 35 are held between the two bearings 25, 27 and the stoppers 33, 37 respectively. As a result, the line roller 23 supported by the two bearings 25, 27 is held as regulated in the axial movement with respect to the support portion 17 via the bearings 25, 27.

The first and second collars 61, 63 are preferably made of a material, for example, such as POM or ABS.

With the structure as described, it is possible to prevent the movement in the axial direction and provide the waterproof, excepting stepwise processing in the inner periphery of the line roller made of a material to be processed as metal or ceramics.

Other operational effects are the same as in the first embodiment and no explanation will be further made.

In the above described embodiments which the seal member is in direct contact with the bearing, the seal member may be so constructed that the seal member is in contact with one of an outer ring and an inner ring of the bearing and is not in contact with the other. That is, the bearing is constituted by the outer ring, the inner ring and balls, and the outer ring is rotated with respect to the inner ring through the balls. Therefore, by providing a space between the seal member and one of the outer ring and the inner, the outer ring can be smoothly rotated with respect to the inner ring. For example, the first seal member 31 in the first embodiment is in direct contact with the bearing 25, more specifically, the inner ring of the bearing 25 is in contact with the first seal member 31, and the outer ring of the bearing 25 is not in contact with the first seal member 31. Therefore, the outer ring can be smoothly rotated with respect to the inner ring, thereby improving the rotation performance of the line roller. This structure can be obtained by forming a taper portion to a portion of the seal member at the inner or outer ring side.

According to the invention, it is possible to provide such a spinning reel for fishing having a fishing line guide device which improves simultaneously the bearing function and the waterproofing function of the line roller while stabilizing the rotation of the line roller.

What is claimed is:

1. A spinning reel for fishing comprising:
   a body;
   a rotor which is rotatably attached to the body and is rotated in accordance with rotation of a handle;
   a supporting arm mounted on the rotor;
   a supporting member attached to the supporting arm;
   a supporting portion defined between the supporting arm and the supporting member;
   a bearing member supported by the supporting portion;
   a line roller, for guiding a fishline, rotatably supported by the bearing member; and
   a pair of seal members for sealing a part between the line roller and the supporting portion, which are disposed on opposite sides of the bearing member so as to abut the bearing member, and
   wherein said pair of seal members are formed of a rubber material.

2. The spinning reel according to claim 1, wherein the line roller is supported by the bearing member so that movement in axial direction of the line roller with respect to the supporting part is prevented.

3. A spinning reel for fishing comprising:
   a body;
   a rotor which is rotatably attached to the body and is rotated in accordance with rotation of a handle; a supporting arm mounted on the rotor;
   a supporting member attached to the supporting arm;
   a supporting portion defined between the supporting arm and the supporting member;
   a bearing member supported by the supporting portion; a line roller, for guiding a fishline, rotatably supported by the bearing member; and
   a pair of seal members for sealing a part between the line roller and the supporting portion, which are disposed on opposite sides of the bearing member, and separated from the bearing member in a direction of a rotation axis of the line roller,
   wherein the bearing member includes a first bearing and a second bearing, and the line roller is provided with a stopper portion which is interposed between the first bearing and the second bearing.

4. The spinning reel according to claim 3, wherein the supporting arm is provided with a first stopper and the supporting member is provided with a second stopper, and the first bearing is held between the stopper portion and the first stopper, and the second bearing is held between the stopper portion and the second stopper.

5. The spinning reel according to claim 4, wherein one of the pair of seal members is interposed between the first bearing and the first stopper, and the other seal member is interposed between the second bearing and the second stopper.

6. The spinning reel according to claim 3 further comprising a stopper abutted against the supporting member, wherein the supporting portion is provided with a peripheral groove into which one of the pair of the seal members is inserted, and wherein the first bearing is held between the stopper portion and the one of the pair of the seal members, and the second bearing is held between the stopper portion and the stopper.

7. The spinning reel according to claim 6, wherein the other seal member is interposed between the second bearing and the stopper.

8. A spinning reel for fishing comprising:
   a body;
   a rotor which is rotatably attached to the body and is rotated in accordance with rotation of a handle;
   a supporting arm mounted on the rotor;
   a supporting member attached to the supporting arm;
   a supporting portion defined between the supporting arm and the supporting member;
   a bearing member supported by the supporting portion; a line roller, for guiding a fishline, rotatably supported by the bearing member; and
   a pair of seal members for sealing a part between the line roller and the supporting portion, which are disposed on opposite sides of the bearing member, and separated from the bearing member in a direction of a rotation axis of the line roller,
   wherein the pair of seal members are provided with taper portions, respectively.

* * * * *